United States Patent
Lee et al.

(10) Patent No.: US 8,745,599 B2
(45) Date of Patent: Jun. 3, 2014

(54) PROBABILISTIC POINTER ANALYSIS METHOD USING SSA FORM

(75) Inventors: Jenq Kuen Lee, Hsinchu (TW); Ming Yu Hung, Hsinchu (TW); Yuan Shin Hwang, New Taipei (TW); Peng Sheng Chen, Min-Hsiung Chia-Yi (TW)

(73) Assignee: National Tsing Hua University, Hsinchu (TW)

( * ) Notice: Subject to any disclaimer, the term of this patent is extended or adjusted under 35 U.S.C. 154(b) by 160 days.

(21) Appl. No.: 13/354,291

(22) Filed: Jan. 19, 2012

(65) Prior Publication Data
US 2013/0191818 A1    Jul. 25, 2013

(51) Int. Cl.
*G06F 9/45* (2006.01)
(52) U.S. Cl.
USPC ............ 717/133; 717/134; 717/143; 717/144

(58) Field of Classification Search
None
See application file for complete search history.

(56) References Cited

U.S. PATENT DOCUMENTS

| | | | |
|---|---|---|---|
| 6,832,370 B1 * | 12/2004 | Srinivasan et al. | 717/161 |
| 2008/0276228 A1 * | 11/2008 | Sreedhar | 717/131 |

\* cited by examiner

*Primary Examiner* — Chuck Kendall
(74) *Attorney, Agent, or Firm* — WPAT, P.C.; Anthony King; Kay Yang

(57) ABSTRACT

A computer-implemented probabilistic pointer analysis method using SSA form comprises the steps of: evaluating a program in an SSA form comprising a target pointer to determine pointer relations between the target pointer, a plurality of aliased pointers related to the target pointer and at least a probable location of the target pointer; and generating a direct probabilistic relation between the target pointer and the at least a probable location of the target pointer according to the pointer relation.

11 Claims, 12 Drawing Sheets

```
int* foo(int* p, int* q)        int* foo(int* p₁, int* q₁)      int* foo(int* p₁, int* q₁)
{                               {                                {
1: int u, v;                    1: int u₁, v₁;                   1: int u₁, v₁;
2: p = &u;                      2: p₁ = &u₁;                     2: p₁ = &u₁;
3: q = &v;                      3: q₁ = &v₁;                     3: q₁ = &v₁;
4: while(...)                   4: p₂ = Φ(p₁, p₄)                4: p₂ = Φ(p₁, p₄)
5:  {                           5: q₂ = Φ(q₁, q₄)                5: q₂ = Φ(q₁, q₄)
6:    if(...)                   6: while(...)                    6: while(...)
7:       p = q;                 7: {                             7: {
8:    else                      8:   if(...)                     8:   if(...)
9:       q = p;                 9:     p₃ = q₂;                  9:     p₃ = q₂;
10: }                           10:  else                        10:  else
11: ...                         11:    q₃ = p₂;                  11:    q₃ = p₂;
12: *p=...;                     12: p₄ = Φ(p₂, p₃)               12: p₄ = Φ(p₂, p₃)
13:                             13: q₄ = Φ(q₂, q₃)               13: q₄ = Φ(q₂, q₃)
14: return p;                   14: }                            14: }
}                               15: p₅ = Φ(p₁, p₄)               15: p₅ = Φ(p₁, p₄)
                                16: q₅ = Φ(q₁, q₄)               16: q₅ = Φ(q₁, q₄)
                                17: ...                          17: ...
                                18: *p₅= ... ;                   18: *p₅= ... ;
                                19: ...                             u₂ = χ(u₁)
                                20: return p₅;                      v₂ = χ(v₁)
                                }                                19: ...
                                                                    μ(u2)
                                                                    μ(v2)
                                                                 20: return p₅;
                                                                 }

Original                        SSA                           SSA with μ, χ
```

FIG. 1

Backtrace(u)

```
1  begin
2     if u.visited = TRUE then
3        return;
4     else
5        u.visited =TRUE;
6        Follow the use-def chain of u in SSA, and find the only one def-site;
7        switch type of def-site do
8           case χ annotation
9              S ∈ the statement associates with χ ;
10             BacktraceChi(S,u);
11          case Φ function
12             BacktracePhi(u);
13          case Statements: S
14             switch S do
15                case Points-to Location
16                   E=E ∪ (u, u_{rb}) | u_{rb} ∈ base address on RHS of S;
17                   w(u, u_{rb})=1 ;
18                   V_l = V_l ∪ u_{rb};
19                   base = u_{rb};
20                   offset = offset + thisOffset | thisOffset = offset on RHS;
21                   return;
22                case Pointers Aliased
23                   E=E ∪ (u, u_{rb}) | u_{rb} ∈ aliased pointer on RHS of S;
24                   w(u, u_{rb})=1;
25                   V_p = V_p ∪ u_{rb};
26                   offset = offset + thisOffset | thisOffset = offset on RHS;
27                   Backtrace(u_{rb});
28                case Updated by Function
29                   BacktraceCallee(S, u) ;
30                case Pointer Parameter
31                   BacktraceCaller(S, u);
32                case Indirect Load
33                   foreach u_μ ∈ operands in μ do
34                      E=E ∪ (u, u_μ);
35                      w(u, u_μ) = frequency from u_μ to u in CFG;
36                      Backtrace(u_μ);
37 end
```

FIG. 5A

BacktraceChi(S, u)
1 begin
2     defProbability =PPA($u_{is}$) | $u_{is}$ ∈ indirect pointer of $S \wedge V_l = u$;
3     $u_{md}$ = dereference of $u_{is}$;
4     S $E=E \cup (u, u_{md})$;
5     $w(u, u_{md})$=defProbability;
6     Backtrace($u_{md}$);
7     $E=E \cup (u, u_\chi)$ | $u_\chi$ ∈ operand in $\chi$ ;
8     $w(u, u_\chi)$=1-defProbability;
9     Backtrace($u_\chi$) ;
10 end BacktracePhi(u)
1 begin
2     foreach $u_\phi$ ∈ *operands in* $\Phi$ do
3        $E=E \cup (u, u_\phi)$ ;
4        $w(u, u_\phi) = frequency\ from\ u_\phi\ to\ u\ in\ CFG$ ;
5        Backtrace($u_\phi$);
6 end BacktraceCallee(S, u)
1 begin
2     $u_{rv}$ ∈ return value of callee of $S$ ;
3     $E = E \cup (u, u_{rv})$ ;
4     $w(u, u_{rv}) = 1$;
5     if $u_{rv}$ = *location* then
6        $V_l = V_l \cup u_{rv}$ ;
7        base = $u_{rv}$ ;
8        return ;
9     else
10        $V_p = V_p \cup u_{rv}$ ;
11        Backtrace($u_{rv}$);
12 end

FIG. 5B

BacktraceCaller(S, u)
1  begin
2     $U_{cp} \in$ corresponding parameters of caller of $S$ ;
3     foreach $u_{cp} \in U_{cp}$ do
4        $E = E \cup (u, u_{cp})$ ;
5        $w(u, u_{cp}) = calling\ frequency$ ;
6        if $u_{cp} = location$ then
7           $V_l = V_l \cup u_{cp}$ ;
8           base $= u_{cp}$ ;
9           return ;
10       else
11          $V_p = V_p \cup u_{cp}$ ;
12          Backtrace($u_{cp}$);
13 end

FIG. 5C

ReduceGraph(G)
1 begin
2     while $E_a \neq \emptyset$ do
3         foreach $u_i \in V_p$ is adjacent to $u_0$ do
4             if $(u_y, u_y) \notin E_a$ then
5                 foreach $u_k \mid u_i$ is adjacent to $u_k$, $u_j$ is adjacent to $u_i$, $u_k \neq u_0$ do
6                     $E = E \cup (u_k, u_j)$;
7                     $w(u_k, u_j) = w(u_k, u_i) * w(u_i, u_j)$;
8                     $E_a = E_a - (u_k, u_i)$;
9                 foreach $u_j$ do
10                     $E = E \cup (u_0, u_j)$;
11                     $w(u_0, u_j) = w(u_0, u_i) * w(u_i, u_j)$;
12                     $E_a = E_a - (u_0, u_i)$;
13                     $E = E - (u_i, u_j)$;
14                     $V_p = V_p - u_i$;
15             else
16                 foreach $(u_y, u_y) \in E_a \wedge V_z$ are adjacent to $u_y$ do
17                     foreach $u_z \in V_z$ do
18                         $w(u_y, u_z) = \dfrac{w(u_y, u_z)}{\sum_{V_z} w(u_y, V_z)}$;
19                     $E_a = E_a - (u_y, u_y)$;
20     $G' = G$
21 end

FIG. 7

PROBABILISTIC POINTER ANALYSIS METHOD USING SSA FORM

BACKGROUND OF THE INVENTION

1. Field of the Invention

The present invention relates to probabilistic pointer analysis method.

2. Description of the Related Art

Pointer analysis is a compiler analysis technique that statically estimates the possible runtime values of a pointer. Due to the dynamic association property of pointers in programs, it is difficult for compilers to know where pointers may point to in general. Without such knowledge, conservative assumptions of pointer information must be made, which may impede aggressive optimizations. There have been considerable efforts on this topic by researchers, and many intra- and inter-procedural pointer analysis algorithms have been developed. In addition, computational cost of gathering pointer information needs to be taken into consideration.

The pointer information gathered by the traditional points-to analysis techniques can be categorized into two types. The first type is definitely-points-to relationships, and the second type is possibly-points-to relationships. For possibly-points-to relationships, the pointer information gathered by the traditional techniques is not precise enough for certain optimization-directed analyses, as it only shows that there is a possibility for one pointer to be located in a location, but fails to show the likelihood. Accordingly, quantitative descriptions are needed for modern compiler optimizations.

Probabilistic points-to analysis (PPA) techniques have been proposed to quantify points-to relationships. Optimizations that can potentially benefit from such compiler information include speculative multithreading execution, data speculation, data pre-fetching, transactional memory, and others. Opportunities can be explored according to the likelihood provided by PPA for follow-up optimizations. In fact, PPA was originally designed to provide a set of transfer functions of data flow analysis for each pointer usage. When the data flow analysis converges, equations must be solved to get probabilistic information. However, the amount of information collected by the data flow analysis is usually large, and consequently the compiler analysis of previous PPA techniques is not efficient for practical use.

In order to reduce the cost of pointer analysis, the present invention discloses a static single assignment (SSA) based approach such that the related locations or addresses of a target pointer can be traced with lower costs.

SUMMARY OF THE INVENTION

The probabilistic pointer analysis method using static single assignment (SSA) form according to one embodiment of the present invention comprises the steps of: evaluating a program in an SSA form comprising a target pointer to determine pointer relations between the target pointer, a plurality of aliased pointers related to the target pointer and at least a probable location of the target pointer; and generating a direct probabilistic relation between the target pointer and the at least a probable location of the target pointer according to the pointer relations.

The probabilistic pointer analysis method using static single assignment (SSA) form according to another embodiment of the present invention comprises the steps of: performing back-trace operations on a target pointer of a program in an SSA form to produce a pointer relation graph (PRG) of the target pointer, wherein the PRG is constructed by a root node, at least a leaf node, a plurality of intermediate nodes and a plurality of edges connecting the root node to the plurality of intermediate nodes and connecting the plurality of intermediate nodes to the at least a leaf node; and performing graph reduction operations on the PRG to produce a reduced PRG comprising only a root node, at least a leaf node and at least an edge connecting the root node to the at least a leaf node. The root node represents the target pointer, the at least a leaf node represents probable location of the target pointer, the plurality of intermediate nodes represents aliased pointers related to the target pointer, and each of the edges represents the probability traveling from the head node connected by the edge to the tail node connected by the edge.

The foregoing has outlined rather broadly the features and technical advantages of the present invention in order that the detailed description of the invention that follows may be better understood. Additional features and advantages of the invention will be described hereinafter, and form the subject of the claims of the invention. It should be appreciated by those skilled in the art that the conception and specific embodiment disclosed may be readily utilized as a basis for modifying or designing other structures or processes for carrying out the same purposes as those of the present invention. It should also be realized by those skilled in the art that such equivalent constructions do not depart from the spirit and scope of the invention as set forth in the appended claims.

BRIEF DESCRIPTION OF THE DRAWINGS

The objectives and advantages of the present invention will become apparent upon reading the following description and upon referring to the accompanying drawings of which:

FIG. 1 shows a fragment of a program and its SSA forms according to an embodiment of the present invention;

FIGS. 5A to 5C show a program implementing one part of the probabilistic pointer analysis method using SSA form according to an embodiment of the present invention;

FIG. 7 shows a program implementing one part of the probabilistic pointer analysis method using SSA form according to an embodiment of the present invention;

DETAILED DESCRIPTION OF THE INVENTION

In compiler design, SSA form is an intermediate representation in which every variable is assigned exactly once. Existing variables in the original intermediate representation are split into multiple versions, and new variables are typically indicated by the original name with a subscript such that every definition gets its own version. As a result, use-def chains are explicit in the SSA form. In order to maintain single assignments at the confluence points in a control flow graph (CFG), SSA introduces Φ function. The Φ function is represented as a pseudo-assignment, and it has a form of Vk=Φ (Vm, Vn, . . . Vi), wherein Vk denotes the new version of V, and the operands denote the old versions that are live until the confluence point.

FIG. 1 shows a fragment of a program on the left side and its SSA form in the middle. As can be seen from FIG. 1, a Φ function is inserted at the points where variables have multiple definitions, such as the beginning and the end of the while loop and the end of the if-else structure. Accordingly, the assignments at the confluence points in the SSA form are unique. If indirect memory operations are considered, it becomes more complicated to maintain the explicit use-def chain. Since a definition is made by an aliasing pointer of a scalar variable, the SSA constructor cannot precisely identify the only def-site solely by symbolic checking. Accordingly, two annotations, MayUse: μ and MayDef: χ are introduced, wherein the two annotations are used to describe the behavior of indirect access operators, e.g. χ is defined as an indirect store operator. The right side of FIG. 1 shows the SSA form of the program fragment with μ and χ annotations on the left side of FIG. 1.

Figure 2:
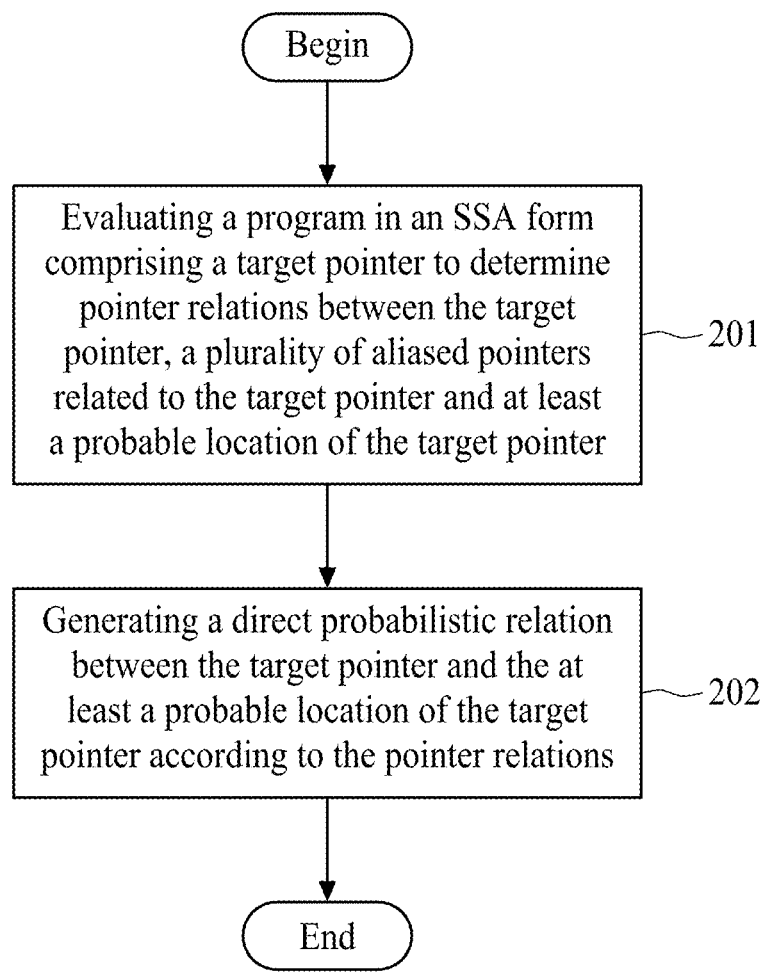
FIG. 2 shows the flow chart of the probabilistic pointer analysis method using SSA form according to an embodiment of the present invention.

The present invention provides a method utilizing SSA form to perform probabilistic pointer analysis. FIG. 2 shows the flow chart of the probabilistic pointer analysis method using SSA form according to an embodiment of the present invention. In step 201, a program in an SSA form which contains the target pointer is evaluated to determine pointer relations between the target pointer, a plurality of aliased pointers related to the target pointer and at least a probable location of the target pointer, and step 202 is executed. In step 202, a direct probabilistic relation between the target pointer and the at least a probable location of the target pointer is generated according to the pointer relations.

Figure 3:
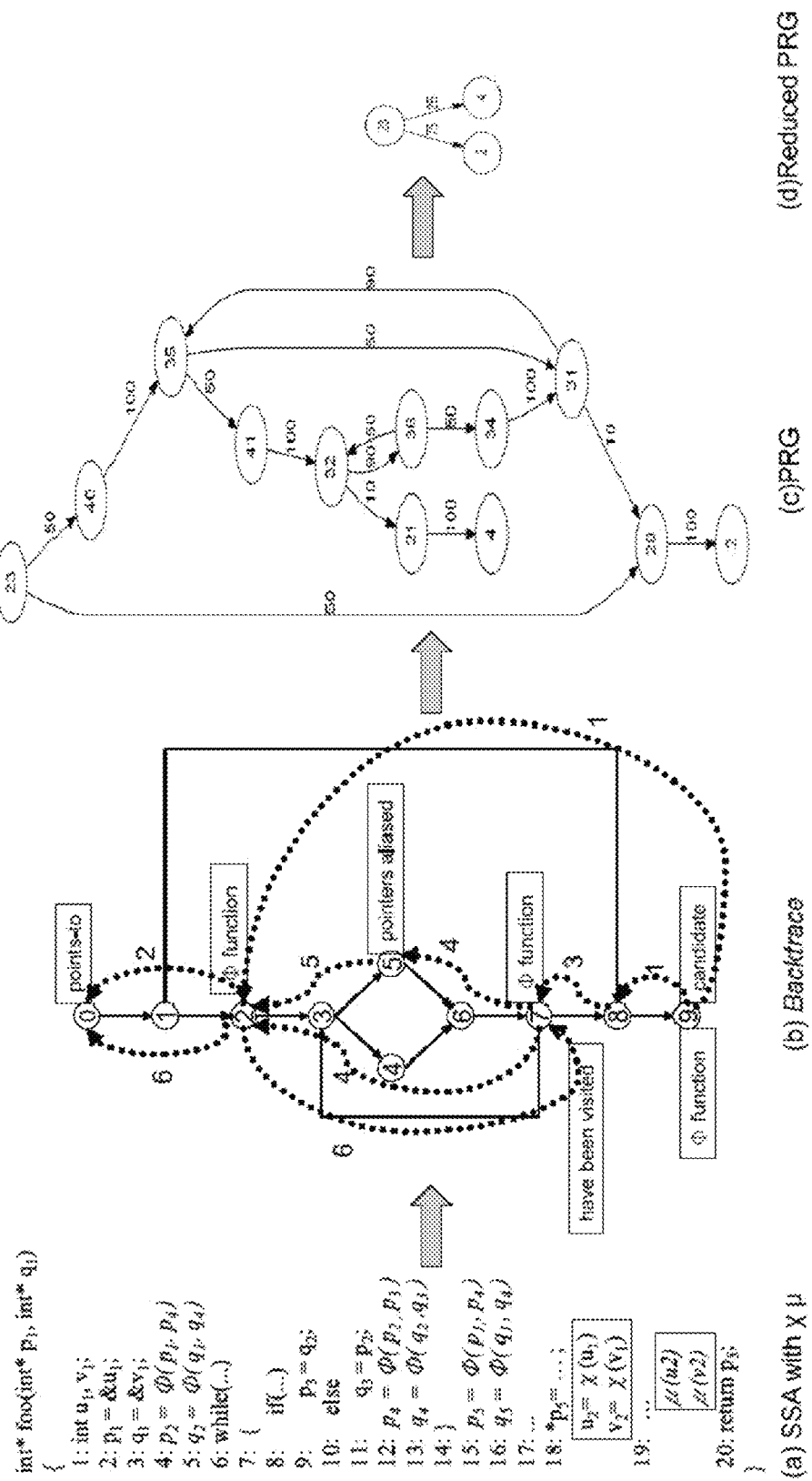
FIG. 3 shows graphical representations for the steps of the method according to an embodiment of the present invention.

FIG. 3 shows graphical representations for the steps of the method according to an embodiment of the present invention. As shown in FIG. 3, a program in SSA form with μ and χ annotations is on the left side. The execution of the evaluation step, i.e. the result of performing back-trace operation in this embodiment, is shown as the middle left graph in FIG. 3. The result of the evaluation step, i.e. the pointer relations between the target pointer, which is p in this embodiment, a plurality of aliased pointers related to the target pointer and at least a probable location of the target pointer, is shown as the middle right graph in FIG. 3. The graph on the right side of FIG. 3 shows the result of the generating step, i.e. the direct probabilistic relation between the target pointer and the at least a probable location of the target pointer. As shown in FIG. 3, the probability for the target pointer 23, to be located at the location 2 is 0.75, and the probability for the target pointer to be located at the location 4 is 0.25.

Figure 4:
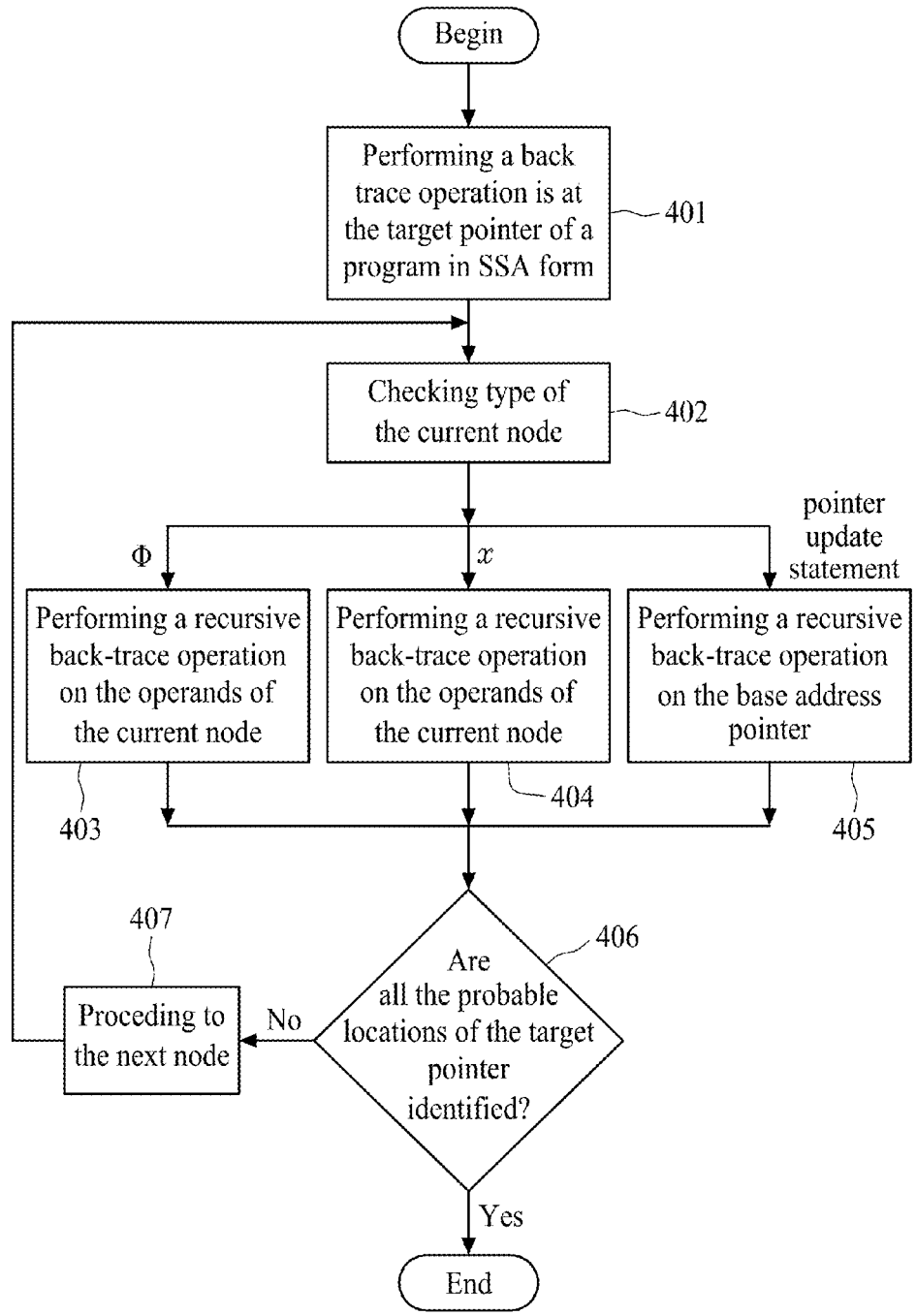
FIG. 4 shows the partial detailed flow chart of the probabilistic pointer analysis method using SSA form according to an embodiment of the present invention.

The following further illustrates each steps of the method shown in FIG. 2. FIG. 4 shows the detailed flow chart of step 201 shown in FIG. 2 according to an embodiment of the present invention, wherein a pointer relation graph (PRG) of the target pointer is generated. In step 401, a back trace operation is performed at the target pointer of a program in SSA form, and step 402 is executed. In step 402, the type of the current node is checked. If the current node is a Φ node, step 403 is executed. If the current node is a χ node, step 404 is executed. If the current node is a pointer update statement, step 405 is executed. In step 403, a recursive back-trace operation is performed on the operands of the current node, and step 406 is executed. In step 404, a recursive back-trace operation is performed on the operands of the current node, and step 406 is executed. In step 405, a recursive back-trace operation is performed on the base address pointer, and step 406 is executed. In step 406, it is determined whether all the probable locations of the target pointer are identified. If all the probable locations of the target pointer are identified, the generating of the PRG of the target pointer is complete; otherwise, step 407 is executed. In step 407, the next node is checked, and step 402 is executed.

FIGS. 5A to 5C show a program implementing the steps shown in FIG. 4 according to an embodiment of the present invention. The main program is the back-trace function shown in FIG. 5A, wherein other functions used by the back-trace function are shown in FIGS. 5B and 5C. As shown in FIGS. 5A to 5C, the main concept of the back-trace operation is to maintain the pointer relations when encountering Φ node, χ node, and pointer update statements. Referring back to FIG. 3, the graph at the middle left shows the processing of the back-trace operation, and the graph at the middle right shows the result, i.e. the PRG of the target pointer, of the back-trace operation. As shown in FIG. 3, the PRG is constructed by a root node, two leaf nodes, a plurality of intermediate nodes and a plurality of edges connecting the root node to the plurality of intermediate nodes and connecting the plurality of intermediate nodes to the at least a leaf node. The root node represents the target pointer, the two leaf nodes represent probable locations of the target pointer, the plurality of intermediate nodes represent aliased pointers related to the target pointer, and each of the edges represents the probability traveling from the head node connected by the edge to the tail node connected by the edge.

In some embodiments of the present invention, the probability of each edge is determined by a predetermined probability assumption for the corresponding instruction. For example, the probabilities of branch-taken and branch-non-taken can be predetermined as 0.5 in both cases, and the probability of leaving a loop can be predetermined as 0.1. In some embodiment of the present invention, the probability of each edge is determined by execution times of the corresponding instruction when executing the program, the profiling operation of the program.

Figure 6:
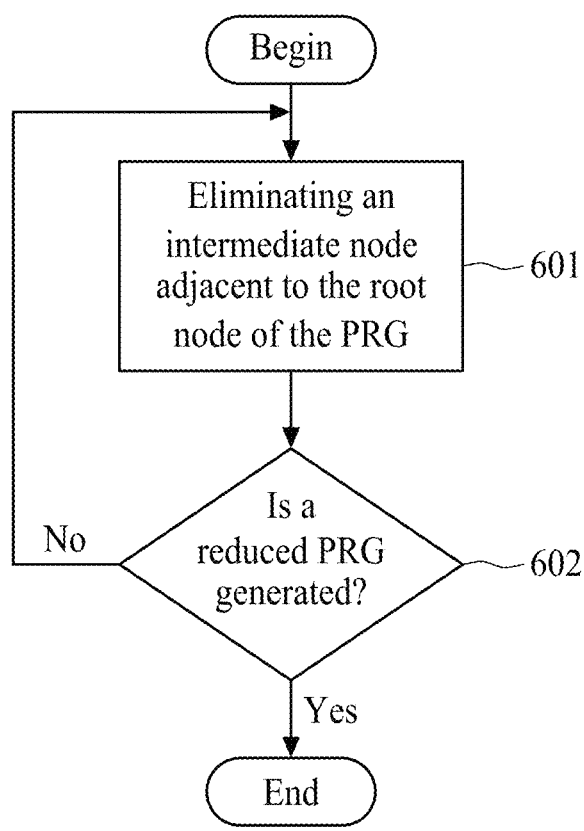
FIG. 6 shows the partial detailed flow chart of the probabilistic pointer analysis method using SSA form according to another embodiment of the present invention.

FIG. 6 shows the detailed flow chart of step 202 shown in FIG. 2 according to an embodiment of the present invention, wherein the PRG of the target pointer is further reduced to generate a direct probabilistic relation between the target pointer and the at least a probable location of the target pointer. In step 601, an intermediate node adjacent to the root node of the PRG is eliminated, the PRG is adjusted accordingly, and step 602 is executed. In step 602, it is checked whether a reduced PRG is generated, wherein the reduced PRG comprises only a root node, at least a leaf node and at least an edge connecting the root node to the at least a leaf node. If the reduced PRG is generated, the direct probabilistic relation between the target pointer and the probable locations of the target pointer is obtained; otherwise, step 601 is executed.

Figure 8:
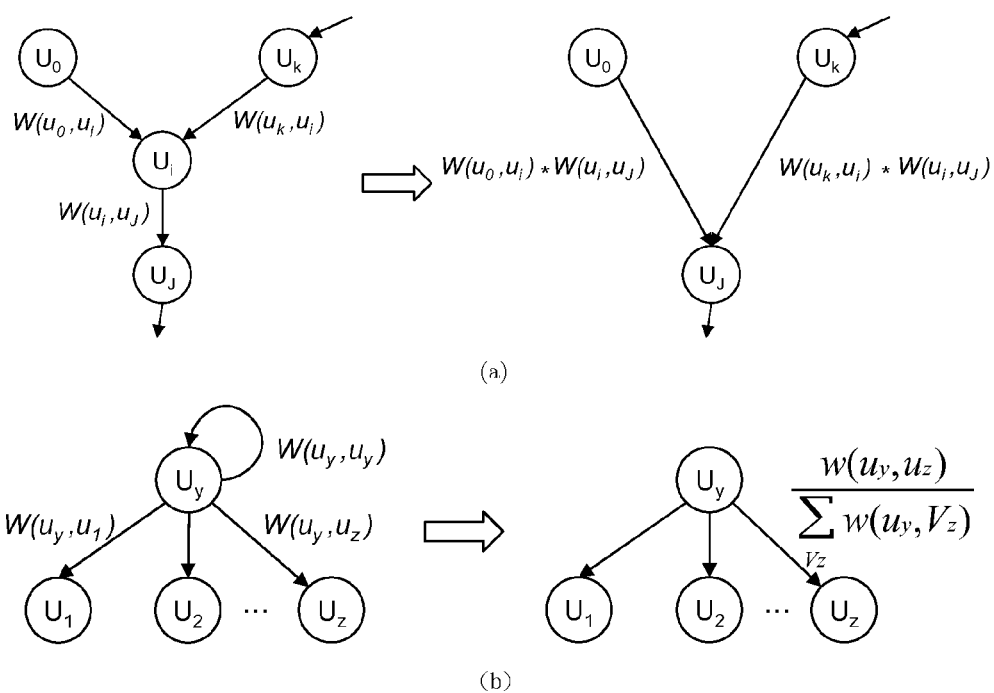
FIG. 8 shows methods of reducing a pointer relation graph according to an embodiment of the present invention.
Figure 9A:
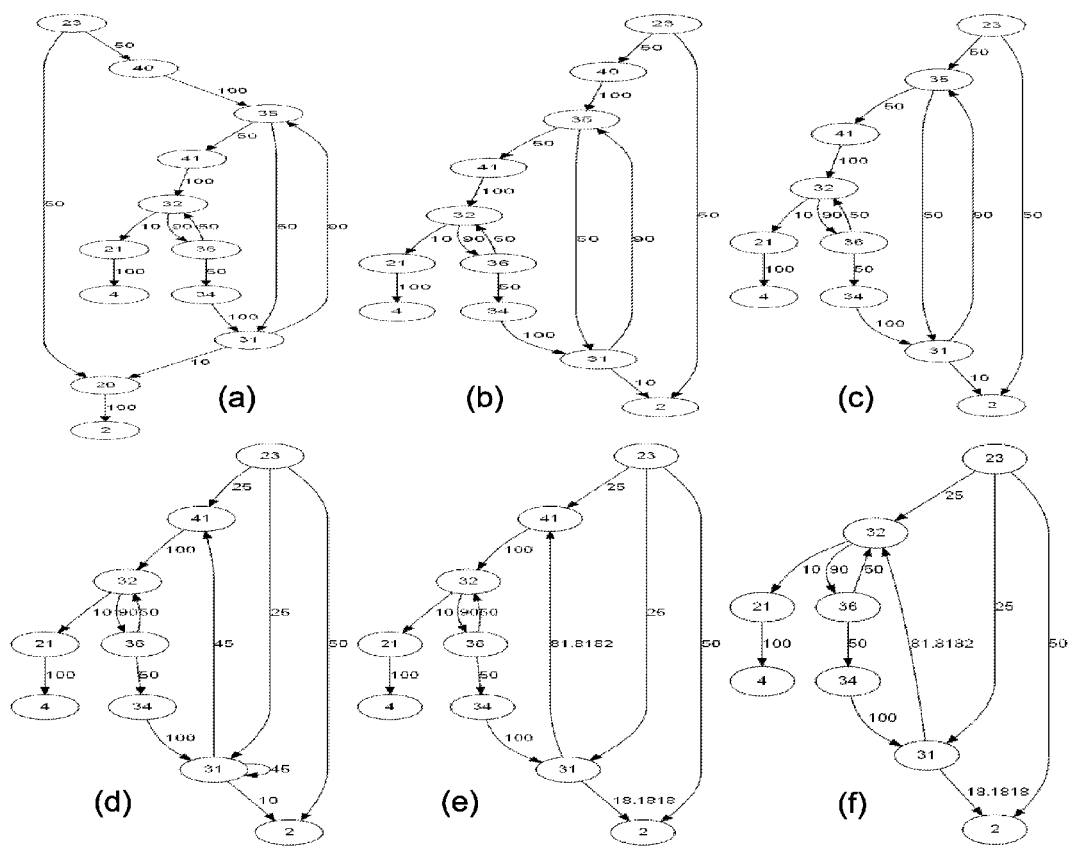
FIG. 9 shows the graphical representation for reducing a pointer relation graph according to an embodiment of the present invention.
Figure 9B:
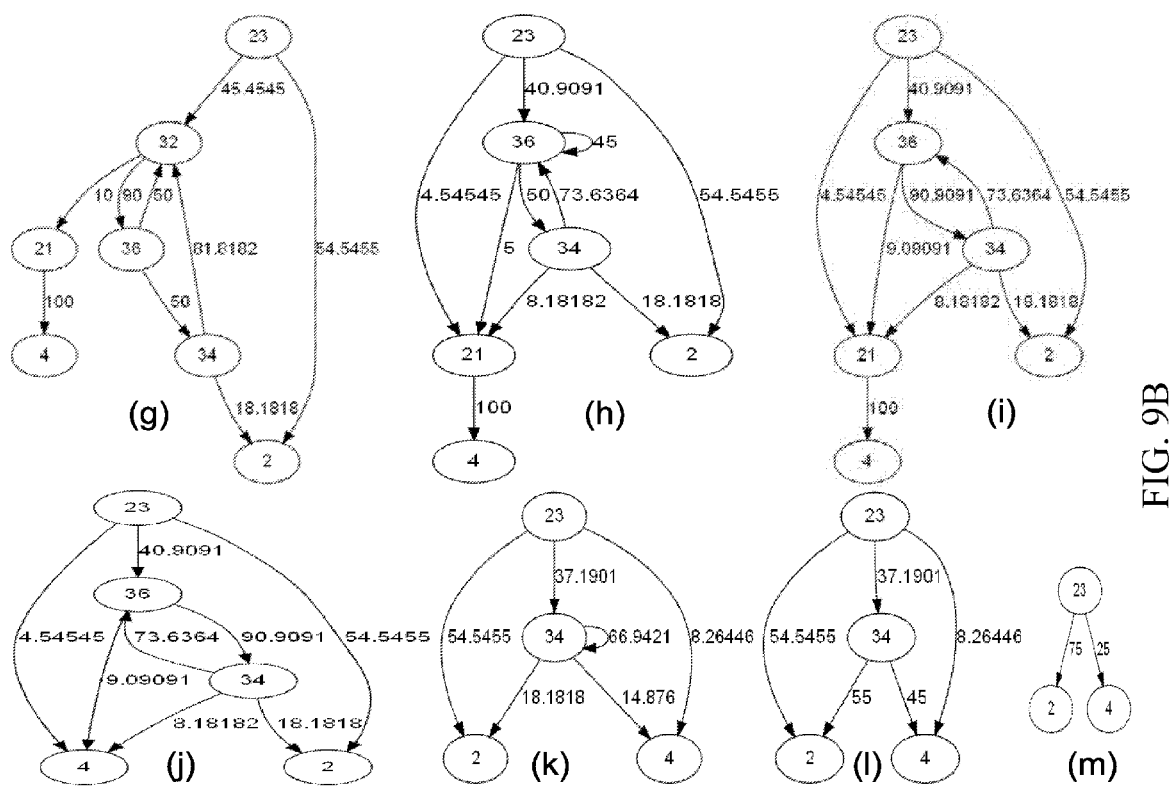

FIG. 7 shows a program implementing the steps shown in FIG. 6 according to an embodiment of the present invention. As shown in FIG. 7, the elimination of a node can be categorized in two types, which are shown in FIG. 8. FIG. 9 (from (a) to (m)) shows the graphical representation for reducing from the PRG shown in the middle right in FIG. 3 to the reduced PRG shown on the right side of FIG. 3. Finally, as shown in the reduced PRG, the probability for the target pointer to be located at the location 2 is 0.75, and the probability for the target pointer to be located at the location 4 is 0.25.

In conclusion, the method provided by the present invention utilizes SSA form such that the related locations or addresses of a target pointer can be traced with lower costs. In addition, by further reducing the pointer relations between the target pointer, a plurality of aliased pointers related to the target pointer and at least a probable location of the target pointer, a direct probabilistic relation between the target pointer and the at least a probable location of the target pointer can be obtained.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Although the present invention and its advantages have been described in detail, it should be understood that various changes, substitutions and alterations can be made herein without departing from the spirit and scope of the invention as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A probabilistic pointer analysis method using static single assignment (SSA) form, comprising the steps, performed by a computer, of:
    evaluating a program in an SSA form comprising a target pointer to determine pointer relations between the target pointer, a plurality of aliased pointers related to the target pointer, at least a probable location of the target pointer, and a Φ function, wherein a portion of the target pointer and the aliased pointers are related through the Φ function, which has a form of Vk=Φ(Vm, Vn, . . . Vi), wherein Vk denotes the new version of V, and operands of the Φ function denote old versions that are live until a confluence point; and
    generating a direct probabilistic relation between the target pointer and the at least a probable location of the target pointer according to the pointer relations.

2. The method of claim 1, wherein the evaluated program is a control flow graph in the SSA form.

3. The method of claim 1, wherein the pointer relations comprise the probabilities of assignments between the target pointer, the plurality of aliased pointers related to the target pointer and the at least a probable location of the target pointer.

4. The method of claim 3, wherein the probabilities of assignments are determined by a plurality of predetermined probability assumptions.

5. The method of claim 3, wherein the probabilities of assignments are determined by profiling the evaluated program.

6. A probabilistic pointer analysis method using static single assignment (SSA) form, comprising the steps, performed by a computer, of:
    performing back-trace operations on a target pointer of a program in an SSA form to produce a pointer relation graph (PRG) of the target pointer, wherein the PRG is constructed by a root node, at least a leaf node, a plurality of intermediate nodes and a plurality of edges connecting the root node to the plurality of intermediate nodes and connecting the plurality of intermediate nodes to the at least a leaf node; and
    performing graph reduction operations on the PRG to produce a reduced PRG comprising only a root node, at least a leaf node and at least an edge connecting the root node to the at least a leaf node;
    wherein the root node represents the target pointer, the at least a leaf node represents probable location of the target pointer, the plurality of intermediate nodes represents aliased pointers related to the target pointer, and each of the edges represents the probability traveling from the head node connected by the edge to the tail node connected by the edge.

7. The method of claim 6, further comprising a step of transforming the program in the SSA form to a control flow graph in the SSA form before the step of performing the back-trace operation.

8. The method of claim 6, wherein the probability of each edge is determined by a predetermined probability assumption for the corresponding instruction.

9. The method of claim 6, wherein the probability of each edge is determined by execution times of the corresponding instruction when executing the program.

10. The method of claim 6, wherein the step of performing the back-trace operation comprises the sub-steps of:
    recursively performing back-trace operation on operands of pseudo assignment and indirect store statement in the program;
    recursively performing back-trace operation on base address pointer of a pointer update statement in the program; and
    repeating back-trace operations until all the probable locations of the pointer are identified.

11. The method of claim 6, wherein the step of performing a graph reduction operation comprises the sub-steps of:
    eliminating an intermediate node adjacent to the root node and adjusting the PRG accordingly; and
    repeating the elimination step until the reduced PRG is generated.

* * * * *